UNITED STATES PATENT OFFICE.

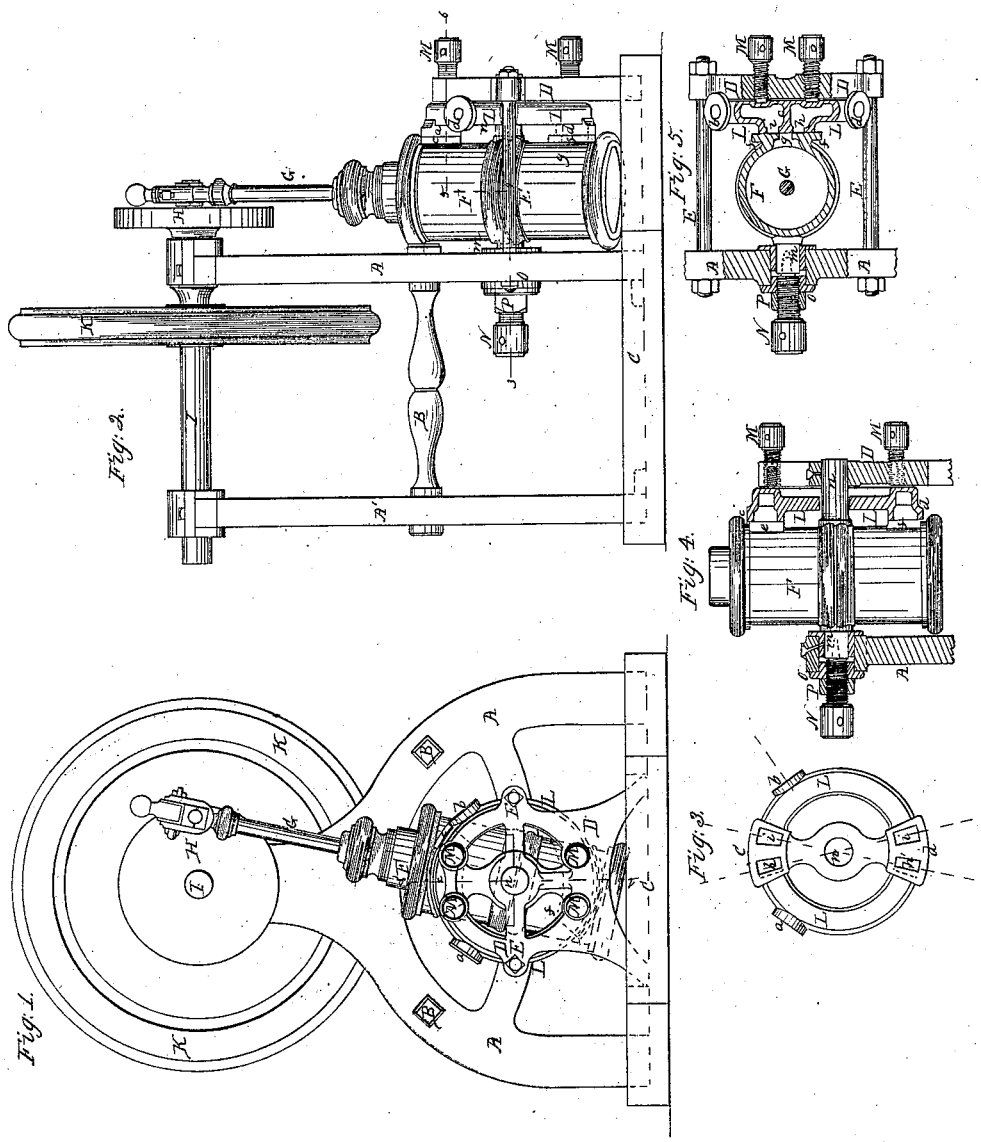

MATTHEW CRIDGE AND SAMUEL WADSWORTH, OF PITTSBURGH, PENNSYLVANIA.

OSCILLATING STEAM-ENGINE.

Specification of Letters Patent No. 12,052, dated December 12, 1854.

*To all whom it may concern:*

Be it known that we, MATTHEW CRIDGE and SAMUEL WADSWORTH, both of Pittsburgh, county of Allegheny, and State of Pennsylvania, have invented a new and useful Improvement in Oscillating Steam-Engines; and we do hereby declare that the following is a full and exact description of the construction and operation of the same, reference being had to the annexed drawings, making part of this specification, in which—

Figure 1 is a front-elevation; Fig. 2 a side-elevation; Fig. 3, a face-view of the side pipe which serves as distributing valve; Fig. 4 a vertical section through line 1—2 of Fig. 1; and Fig. 5 a horizontal section through the line 3—4—5—6 of Fig. 2.

In all figures the same letters refer to the same parts.

A A′ are stands forming the frame, which are connected by the collar bolts B B; C, the foundation plate, on which the stands A A′ rest. D is another stand fastened on the foundation plate, and connected with frame A by the collar bolts E E.

F is the cylinder whose journals $m$ and $n$ rest on the frames A and D.

G is the piston rod; H, the crank; I, the shaft; K, the fly wheel.

L is the side pipe for the distribution and exhaustion of the steam; the steam enters into the side pipe at $a$ (where the throttle valve or steam pipe connects), and escapes at $b$ (where the escape pipe connects).

$c$ and $d$ are surfaces with the openings $h$ $h'$ for the admission of the steam to the cylinders, and with the openings $i$ $i'$ for the exhaustion of the steam; $h$ $h'$, communicating with the receiving opening $a$; $i$ $i'$, communicating with the escape opening $b$.

$e$ and $f$ are surfaces at each end of the cylinder, corresponding with the surfaces of the side pipe, and provided with the openings $g$ $g$, through which the steam passes to and from the cylinder. By the oscillations of the cylinder the openings $g$ $g$ will come into alternate communication with the admission openings $h$ $h'$, and with the exhaust openings $i$ $i'$ of the side pipe.

M M are four adjusting screws, directly or nearly opposite the admission, and exhaust openings of the side pipe; they pass through the frame D and their ends are sunk into corresponding recesses provided in the side pipe, which is hereby kept stationary, when the cylinder is oscillating.

N is a counter set screw, acting against the end of the journal $m$ of the cylinder, in which a tapered steel point is inserted, both steel point and end of screw being hardened, to prevent wearing off.

O is the nut of the screw N, fastened to the frame A.

P is a jam-nut.

In the described engine the improvement consists in the application of the four set screws M M and the counter screw N, which together form a complete system of regulation. By means of the set screws M the joints between the surfaces $c$, $d$ and $e$, $f$, can be kept perfectly steam tight. The position of the set screws being opposite the openings $h$ and $i$, the reacting power of the steam against the side pipe, (which strives to open the joint) is directly counteracted by them, and if leakage should show on any side of one of the surfaces, it can be easily remedied by tightening the corresponding set screw. The reacting power of the steam from the surfaces against the cylinder, and the pressure of the set screw M is resisted by the counter screw N, by which at the same time, the vertical position of the cylinder under the crank can be regulated. There have been engines constructed, in which the surfaces of the side pipe are designed to be kept steam tight by means of an adjusting screw and washer set on the journal of the cylinder; but in such an arrangement, the side pipe being liable to spring, the reacting power of the steam not acting diametrically on the side pipe, produces a tendency in the surfaces, to open on one side and to wear away on the escaping side, which by using a regulating screw on the journal is not directly counteracted. In our improved arrangement, in which the set screws operate directly on the places, where the reaction is, there can be neither springing in the side pipe, nor any tendency of the surfaces to open on one side and to wear away on another at the same time, the friction, which in the above mentioned arrangement, exists between the washer on the journal and the side pipe is avoided in our arrangement, where the reacting steam pressure is resisted by the counter set screw N, which butting against the steel point of the journal $m$, reduces the friction to a minimum.

Experience has shown, that in oscillating engines, where the side pipe is adjusted by a screw and washer, set on the journal of the cylinder, the above mentioned objections are of such a serious nature, that they render engines of that construction almost useless. Of our engines, we have several put into operation, and they exhibit fully the advantages, which we demonstrated above.

We do not claim the side pipe, as such have been used before in different shapes, but

What we claim as our invention, and desire to secure by Letters Patent is—

The arrangement: of adjusting the side pipe of an oscillating engine by means of setscrews (M) (or any other means being for the same purpose) to act directly on the places, where the steam reacts on, viz: opposite the steam and escape openings in the surfaces ($c$ and $d$) of the side pipe; and of resisting at the same time the reacting power of the steam against the side of the cylinder by means of a counter set screw N, (or by any other means being for the same purpose); the set screws M and counter set screw N forming a complete system of regulation for the purpose of keeping the surfaces between cylinder and side pipe steam tight, and adjusting the position of the cylinder, substantially as described.

MATTHEW CRIDGE.
SAMUEL WADSWORTH.

Witnesses:
HENRY MOSER,
JOHN W. BARR.